United States Patent
Choi et al.

(10) Patent No.: US 9,391,691 B2
(45) Date of Patent: Jul. 12, 2016

(54) PROCESS OF SPECTRUM DIVERSITY OF SATELLITE LINK FOR DATA AND INTERNET APPLICATIONS USING SINGLE ANTENNA AND ROUTER

(71) Applicant: Asia Broadcast Satellite Limited, Hamilton (BM)

(72) Inventors: Thomas Kyo Choi, Hong Kong (HK); Meiditomo Sutyarjoko, Jakarta (ID)

(73) Assignee: ASIA BROADCAST SATELLITE LIMITED, Hamilton (BM)

( * ) Notice: Subject to any disclaimer, the term of this patent is extended or adjusted under 35 U.S.C. 154(b) by 58 days.

(21) Appl. No.: 13/980,509

(22) PCT Filed: Dec. 17, 2012

(86) PCT No.: PCT/US2012/070061
§ 371 (c)(1),
(2) Date: Jul. 18, 2013

(87) PCT Pub. No.: WO2013/096181
PCT Pub. Date: Jun. 27, 2013

(65) Prior Publication Data
US 2013/0295841 A1 Nov. 7, 2013

Related U.S. Application Data

(60) Provisional application No. 61/578,050, filed on Dec. 20, 2011.

(51) Int. Cl.
*H04B 7/185* (2006.01)
*H01Q 3/24* (2006.01)
(Continued)

(52) U.S. Cl.
CPC ............. *H04B 7/18513* (2013.01); *H01Q 3/24* (2013.01); *H01Q 5/45* (2015.01); *H01Q 21/28* (2013.01); *H04B 7/18578* (2013.01)

(58) Field of Classification Search
CPC ........... H04B 17/0075; H04B 7/18517; H04B 7/18539; H04B 7/18543
USPC ........ 455/12.1, 427, 3.02, 13.2, 67.11, 115.1, 455/226.1; 370/321, 246, 252
See application file for complete search history.

(56) References Cited

U.S. PATENT DOCUMENTS 4,375,697 A * 3/1983 Visher .......................... 455/13.1
6,067,453 A * 5/2000 Adiwoso et al. ............... 455/430
(Continued)

OTHER PUBLICATIONS

Mark D. Cavalier, et al., "Antenna System for Multi-Band Satellite Communications", Nov. 1997, Retrieved from Internet on Feb. 6, 2013, <URL:http://ieeexplore.ieee.org/xpls/abs_all.jsp?arnumber=648717>, pp. 276-280.
(Continued)

*Primary Examiner* — Ankur Jain
(74) *Attorney, Agent, or Firm* — Sughrue Mion, PLLC (57) ABSTRACT

A satellite communication system between a source and a destination over multiple satellite communications paths including first identifying the link performance established in multiple spectrums, performing a link comparison among the multiple spectrums (for example C-, Ku-, or Ka-Band) in order to determine a spectrum link that provides the highest throughput within an acceptable reliability criteria, and switching among the multiple spectrum links to provide that determined spectrum link between the source and the destination.

18 Claims, 4 Drawing Sheets

Block Diagram of System Implementation Technique (51) Int. Cl.
*H01Q 21/28* (2006.01)
*H01Q 5/45* (2015.01)

(56) References Cited

U.S. PATENT DOCUMENTS

| | | | |
|---|---|---|---|
| 6,233,451 B1* | 5/2001 | Noerpel et al. | 455/427 |
| 6,600,730 B1 | 7/2003 | Davis et al. | |
| 8,364,107 B2* | 1/2013 | Jackson et al. | 455/226.1 |
| 8,914,536 B2* | 12/2014 | Beeler et al. | 709/231 |
| 2002/0009059 A1* | 1/2002 | Abutaleb et al. | 370/318 |
| 2003/0122723 A1 | 7/2003 | Luly et al. | |
| 2004/0066347 A1 | 4/2004 | Schiff | |
| 2006/0040612 A1* | 2/2006 | Min | 455/12.1 |
| 2006/0105707 A1 | 5/2006 | Karabinis | |
| 2006/0276143 A1* | 12/2006 | Anglin | H04B 1/71632 455/81 |
| 2007/0281604 A1 | 12/2007 | Morris et al. | |
| 2008/0018545 A1* | 1/2008 | Kaplan et al. | 343/713 |
| 2009/0022088 A1* | 1/2009 | Wahlberg et al. | 370/321 |
| 2010/0034136 A1* | 2/2010 | Brener et al. | 370/321 |
| 2011/0012801 A1 | 1/2011 | Monte et al. | |
| 2011/0205136 A1 | 8/2011 | Runyon et al. | |
| 2011/0217976 A1 | 9/2011 | Kaplan et al. | |
| 2012/0188880 A1* | 7/2012 | Beeler et al. | 370/246 |
| 2013/0077490 A1* | 3/2013 | Sela et al. | 370/235 |
| 2014/0250469 A1* | 9/2014 | Locatori | 725/68 |

OTHER PUBLICATIONS

International Search Report of PCT/US2012/070061 dated Feb. 26, 2013.

* cited by examiner

Figure 1: Block Diagram of System Implementation Technique

Figure 2: Block Diagram of Network Hub

Figure 3: Block Diagram of the Remote Terminal

Figure 4: Flow Diagram of the Spectrum Diversity Process

PROCESS OF SPECTRUM DIVERSITY OF SATELLITE LINK FOR DATA AND INTERNET APPLICATIONS USING SINGLE ANTENNA AND ROUTER

BACKGROUND OF THE INVENTION

The following U.S. applications and patents are related to the subject matter of the present invention:

1. US Patent Application Serial No.: US 2003/0172182 A1, 11 Sep. 2003, "Multipath Content Distribution Aggregation";
2. U.S. patent application Ser. No. 09/784,948, 15 Feb. 2011, "Paging During Media Loading";
3. U.S. patent application Ser. No. 09/784,843, 15 Feb. 2011, "Programming Content Distribution";
4. U.S. patent application Ser. No. 09/784,843, 15 Feb. 2011, "Distributed Storage of Audio/Video Content (the Distributed Storage Application)";
5. U.S. patent application Ser. No. 09/784,843, 15 Feb. 2001, "Broadcast Message Management (the Broadcast Message Management Application)".
6. US Patent Application Serial No. 2006/0181472 A1, 17 Aug. 2006, "Multiple Beam Feed Assembly";
7. U.S. Pat. No. 7,202,833 B2, 10 Apr. 2007, "Thi-Head Kakuka Feed For Single Offset Dish Antenna";
8. US Patent Publication No. US 2010/0022238 A1, 18 Jan. 2010, "Signal Transmission Mechanism With Diversity Gain in Satellite Communication Network";
9. U.S. Pat. No. 6,442,385 B1, 27 Aug. 2002, "Method and Apparatus For Selectively Operating Satellites In Tundra Orbits to Reduce Received Buffering Requirements for Time Diversity Signals",
10. U.S. Pat. No. 7,711,335 B2, 4 May 2010, "Digital Satellite Receiver and Method for Switching Among Multiple Receiver Antennas Using Diversity Circuitry";

Each of the above-listed ten (10) U.S. applications and patents is incorporated herein by reference.

The present invention in general concerns a geostationary satellite communication network using a hub network and a very small aperture terminal (VSAT). It is particularly directed to a geostationary satellite communication system ("satellite") carrying data and Internet traffic on typical Fixed Satellite Services (FSS) bands (such as C, Ku, and Ka) with a single remote antenna dish and router.

Conventionally, a satellite communication network uses a network hub and a remote VSAT (or "Remote Terminal") including a satellite dish, a feed, a low noise amplifier (LNA) or a low noise block down converter (LNB), a modulator/demodulator (modem), and a router. Each system uses a single dish, a single feed, an LNB, a modulator and a router, unique for each FSS band, namely, C-, Ku-, or Ka-Band in which its data throughput is limited for each band capacity. Higher spectrum provides higher data throughput due to higher availability of the spectrum. However, in a satellite link, the use of a higher spectrum suffers from the attendant problem of a higher probability of link degradation due to weather variations. On the other hand, a lower spectrum provides lower data throughput, but offers better link robustness. A multiple feed system (the feeds, the LNA or LNBs, and the radio frequency transmissions) in a single dish is a known system. This know system has been widely used for direct to home (DTH) applications, for receiving content from more than one Broadcast Satellite Services (BSS) network in a single spectrum (for example C- or Ku or Ka-Band) or multi spectrum (for example C- and Ku-Band).

The system according to the present invention discovered that it is possible to put multiple FSS networks (for example C-, Ku-, or Ka-Band) in a single dish and router that allow seamless transition among networks for the purpose of throughput maximization for the end users.

The object of the present invention is to increase data throughput for users within the coverage of multi spectrum FSS, when there is a possibility of using a higher spectrum (for example Ku- or Ka-Band) while maintaining the default throughput on a lower spectrum (for example C-Band).

The fact is, some geographical regions are able to operate in a lower spectrum (C-Band) with high service availability, and in higher spectrums (Ku- and Ka-Band) but with lower service availability. Lower service availability (or "lower availability") on higher spectrum motivates satellite communication network operators in some parts of the geographical regions to operate only in the lower spectrum. This is unfortunate because the use of higher spectrum in the same geographical location under certain conditions gives higher data throughput albeit with lower availability. However, the present invention recognizes that lower availability "does not have to mean zero availability".

Focusing on the economics of "does not mean have to mean zero availability" creates a possibility for users to maximize throughput on the higher spectrums on a statistical basis. Whenever possible, users will obtain higher throughput using a higher spectrum, and when the weather condition does not permit a desirable link margin for a sufficient user experience, then the system will seamlessly select the lower spectrum in their receiver system, i.e., a spectrum that offers lower throughput but a more robust link. The system according to an exemplary embodiment does this without the loss of the communication link during the transition between spectrums.

The lower throughput with a more robust link is defined as the "Default Throughput". The satellite communication link that provides the Default Throughput is defined as the "Default Link." The condition when only the Default Link can be established is defined as the "Default Condition".

The higher throughput with less robust links is defined as the "Variable Throughput". The satellite communication links that provide the Variable Throughput are defined as the "Variable Links". The establishment of Variable Links is possible when the satellite transmission parameters allow the closure of the link with sufficient margin as determined by the service operator. The condition when the Default Link and the Variable Links can be established is defined as the "Advantageous Condition".

When the Default Condition occurs, the user will obtain the Default Throughput on the Default Link. When the Advantageous Condition occurs, the user will obtain the Variable Link at least most of the time. Under the Advantageous Condition, the user will experience higher data speed when, for example, browsing the Internet or downloading/uploading data.

The process of switching between the Default to Variable Links, is transparent to the user. The desired link margin for each link is determined by the communication parameters (e.g., the modulation scheme, the satellite parameters, the hub parameters, the remote terminal parameters, and the geographical location, such as latitude and longitude) and stored in the modem.

This approach according to an exemplary embodiment of the invention is likely to be more and more desirable as users download larger amounts of data, such as movies or videos, use transfer control protocol/internet protocol (TCP/IP) over satellite, multiple spectrum satellite payload becomes more common, and TCP/IP allows more tolerant statistically variable throughput. Higher throughput spectrums (Ku- and Ka- Band) therefore will remain an advantage even for users in high precipitation areas, provided that users always have the guaranteed fall back services set by either C- or Ku-Band systems in a single product.

SUMMARY OF THE INVENTION

The present invention addresses and obviates the unavailability of existing methods and products in the market carrying multiple spectrum FSS on single dish and router.

Thus, in accordance with one exemplary embodiment of the invention, the system is directed to maximizing data throughput using C-, Ku-, and Ka-Bands. This is accomplished by first identifying the available link performance in terms of, for example, $$\frac{E_b}{N_o}$$

(Energy per bit and noise power density ratio).

According to an exemplary embodiment, a default Link is set for the lowest available spectrum with highest $$\frac{E_b}{N_o}$$

that gives the Default Throughput. Information about the Default

Link and the Default Throughput detail can be stored in, for example, the modem and generally fixed, but can be changed from time to time.

After the establishment of the Default Throughput and Link, the modem then determines the Variable Throughputs and Links. The Variable Throughputs and Link is determined by evaluating the higher spectrum link parameters. Higher spectrums that have sufficient $$\frac{E_b}{N_o}$$

for specified user experience or are set by selected modulation schemes (e.g., the scheme can be set to a default selected by the service operator or determined by the users), and are then declared as the Variable Link and the attendant information is stored, for example, in the modem. From time to time, the system will switch among the Variable Link(s) and back to the Default Link, whichever provides a higher throughput at an acceptable link margin condition.

In a further exemplary embodiment of the invention, the system emphasizes that seamless switching among the diversely available spectrum is started with the establishment of the lowest throughput link that serves as the Default Link. Once the Default Link is established, the system continuously monitors the availability of the higher spectrum links and updates their availability over time. Depending on the preference setting determined by user, the system will seamlessly and automatically switch to higher throughput link(s) or Variable Link(s) so long as the higher throughput link(s) are within an acceptable link margin condition.

In another exemplary embodiment of the invention, the system emphasizes that the implementation of the proposed method can be accomplished using widely available commercial off the shelf (COTS) components, such as an antenna dish, an antenna feed, an LNA or LNB, and a router on the Network Hub as well as at the Remote Terminal. Particular to the antenna feeds, they are required to be put onto the feed mounting system in order to allow the reception of dual satellite spectrum reception (C- and Ku, or Ku- and Ka, or C- and Ka-Bands) or triple satellite spectrum reception (C-, Ku-, and Ka-Bands).

According to an exemplary embodiment of the invention, a device is provided that allows functionality to simultaneously measure the communication link performance parameters and store these parameters. This functionality can be, for example, embedded in the modem or can be provided in an externally interfaced programmable device, such as a microprocessor or personal computer.

The system according to an exemplary embodiment is distinguished from the traditional VSAT systems in connection with, for example, the programmability features of the device that can be stored in the modem or other device. The modem according to the exemplary embodiment can be multiple modems for each of the satellite spectrums individually (e.g., it has RF-Baseband circuits for each spectrum), or it can be a specifically designed modem that uses different RF circuits for each spectrum but only a single Baseband that has multiple RF interfaces (C-, Ku-, and Ka-Band) simultaneously. Furthermore, according to an exemplary embodiment, the modem intelligent capability needs to simultaneously measure $$\frac{E_b}{N_o}$$

for each input, for each modulation scheme, and to store the result in its memory or in another device's memory for further processing.

DESCRIPTION OF THE PREFERRED EMBODIMENTS

Figure 1:
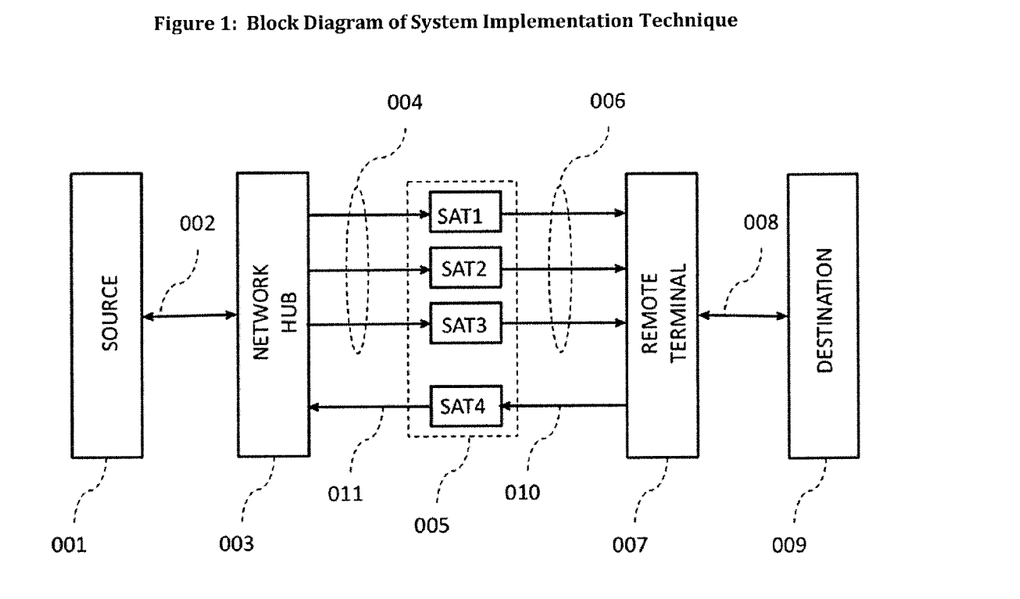
FIG. 1 is a block diagram of an exemplary system for implementing techniques of the present invention.

FIG. 1 is a block diagram showing one example of a system that may be used in implementing the techniques of the present invention. Included in the system is a network hub (003) including a multiple spectrum transmitter system for single or multiple adjacent satellites with multiple spectrum payload capacity. The network hub distributes the data to users simultaneously on multiple spectrums in an open loop operation. A Remote Terminal (007) independently selects the guaranteed link and at the appropriate time establishes the higher throughput link(s) according to the preference link performance setting by the modulation and user experience, as set by the user or by a default configuration. Although multiple links (a guaranteed link, and higher throughput links) are established at the physical layer, a user in any case can only establish one logical and IP link layer at a time.

As shown in FIG. 1, Source (001) is connected (002) to the system through the network hub (003). The Network hub has the capability to simultaneously transmit into three different forward uplink spectrums (e.g., C-, Ku-, and Ka-Bands) (004) from the same source to multiple payload satellites (SAT1, SAT2, SAT3) in satellite system (005) or to single satellites; and to receive from a single satellite (SAT4) from satellite system (005). Each satellite translates the uplink spectrum into an appropriate forward downlink spectrum (006). The remote terminal (007) has the capability to receive simultaneously the different spectrums and monitors their link performance over time. The Remote Terminal feeds the data from the demodulated signal to the destination path (008). The destination, on the transmit path, feeds the data into the remote terminal (009) and then the data is transmitted using the return uplink spectrum (010) onto the satellite (SAT4) which translates the spectrum into the return downlink spectrum (011) to the network hub (003) and to the source (001).

The source (001) may, for example, be an Internet Cloud, Internet server or a server of any other network. In this regard, the network hub (003) simultaneously transmits the Internet traffic over the three spectrums on the uplink path (004) on to a single satellite system with multiple payloads (005) or on to multiple satellites with a single payload in each satellite (SAT1, SAT2, and SAT3). The downlink paths translate the spectrums and then feed them into the remote terminal (007) simultaneously over paths (006).

The source (001) may communicate with destination (009) via one of the available physical links that are simultaneously interconnected with the satellite(s) system (005). The destination (009) may be a single Internet user or multiple Internet users that in any instance has a single IP connection with the source (001) at a time, despite that multiple physical links are established. As shown, for example, in FIG. 1, the system includes a return link (010 and 011) using a single spectrum that provide the highest link margin, i.e. the same spectrum as the Default Link.

Figure 2:
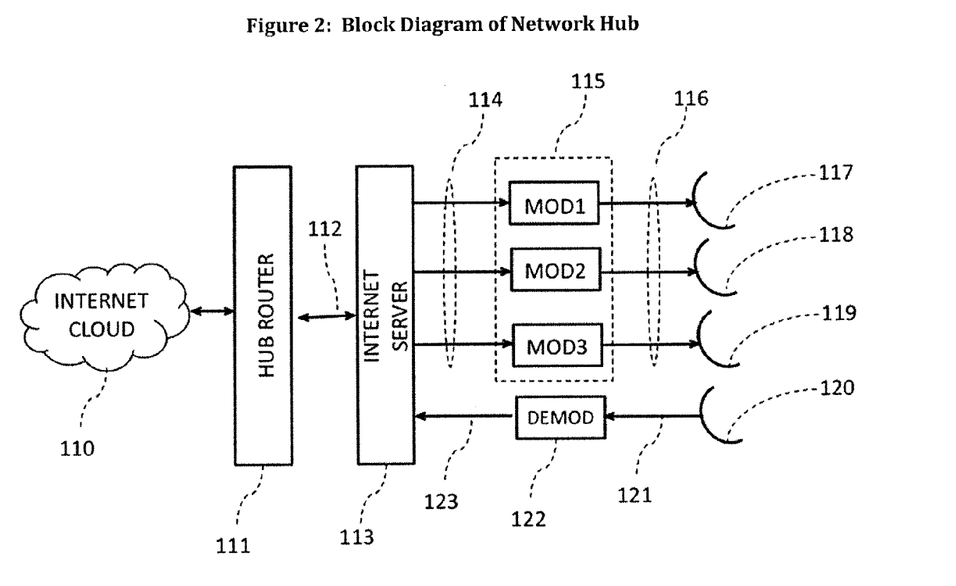
FIG. 2 is a block diagram for an exemplary network hub.

FIG. 2 is a block diagram of the network hub according to an exemplary embodiment that may be used to implement the techniques of the present invention. Included in the system is a hub router (111) that connects to the three modulators (MOD1, MOD2, MOD3) via paths 114 using an intermediate frequency such as 70 MHz, 140 MHz, or L-Band (900-1600 GHz) frequency. Modulator output spectrums are at the appropriate radio frequency spectrum, namely C-, Ku-, and Ka-Band, that are subsequently fed, amplified (116) and then radiated over the uplink antennas (117, 118, and 119) for each of the spectrums. Internet Server (113) simultaneously transmits via the modulator (115) the Internet traffic on to each of the antennas with different throughput as set by the hub router according to each user's subscription profile. As shown in FIG. 2, the network contains connectivity among the Internet Cloud (110), the Hub Router (111) and Internet Server (113), the modulators (115), the demodulator (122), and the satellite dishes (117, 118, 119, and 120). Modulators (115) are dedicated to each of the spectrums (C-, Ku-, and Ka-Band), and so are the corresponding the antennas. The return link (121, 123) is only dedicated on a single spectrum that sets the Default Link.

Figure 3:
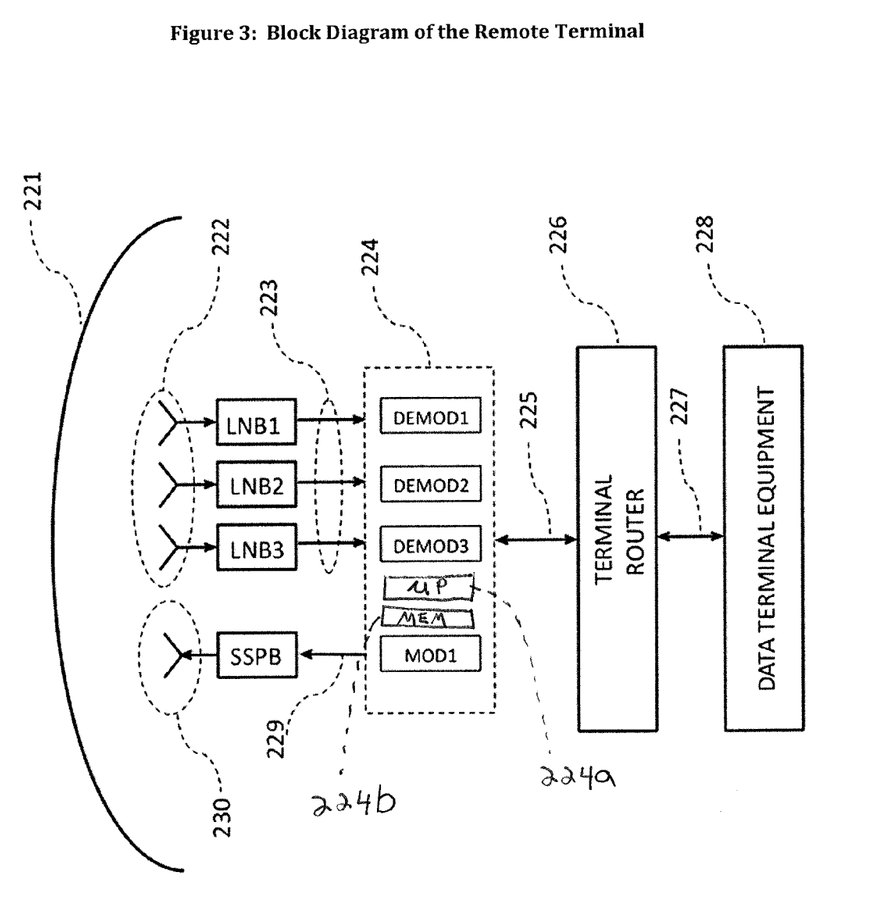
FIG. 3 is a block diagram for an exemplary remote terminal.

FIG. 3 illustrates the remote terminal configuration according to an exemplary embodiment that can be used to implement this invention. As shown in FIG. 3, the remote terminal contains connectivity among Single Antenna Dish (221), C-, Ku-, and Ka-Band receive feeds (222), Low Noise Block Down Converters (LNBs), Modem (224), Terminal Router (226), and Data Terminal Equipment or DTE (228). In operation, the antenna dish (221) collects the radio frequency spectrum from multiple payload satellite(s), which are then channeled by each of the feeds (222), amplified by each of the LNBs, and then routed into the modulator/demodulator or modem (224), to make the connection to the terminal router (226). The modem (224) continuously measures and saves in memory (224b) each of the link performance parameters ( $$\frac{E_b}{N_o},$$

received signal level, and effective throughput), and a processor (224a) is used to select one link to logically connect the downlink paths (222 and 223) with the terminal router (226) via the RJ45 (225) interface. The seamless connection to the end users is achieved by allowing the modem (224) to simultaneously connect physically more than one downlink path with the modem, and store in memory the Internet traffic flow from one path that does not logically connect with the terminal router (226), but matches the Internet traffic flow from another path that is currently logically connected with the terminal server (226). Once the match traffic is achieved, the logical connection can be served via different physical connections in different spectrum to provide the higher throughput during the advantageous condition. i.e., when the Variable Link can be utilized.

During a disadvantageous condition, in which, for example, the weather may not permit for a link with a higher spectrum, the logical transitions to preserve the link for users that do not experience disconnected links. Such logical transitions will only be felt by users as a reduction in throughput rather than a disconnection. In any case, the guaranteed link is the link that provides the highest link margin for the same modulation scheme and bandwidth that connects the source (001) and the destination (009).

Figure 4:
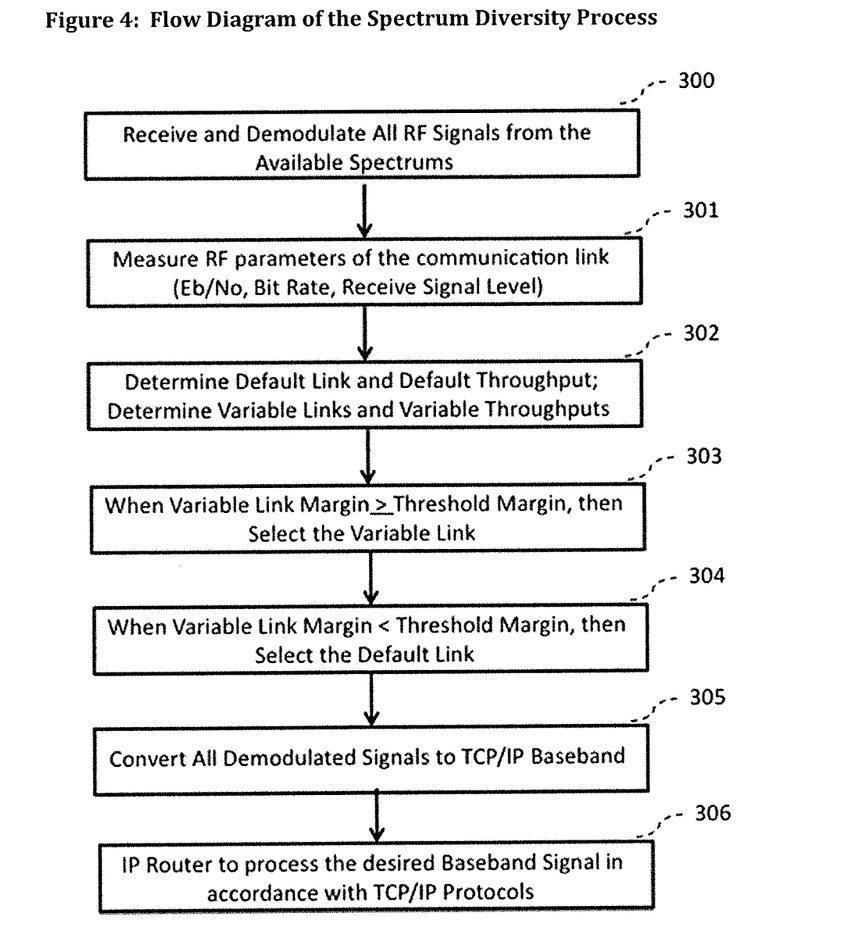
FIG. 4 is a Flow Diagram of the exemplary Process of the Spectrum Diversity methodology allowing multiple satellite receptions into single traffic router.

FIG. 4 shows the Flow Diagram of the Process of the Spectrum Diversity methodology allowing multiple satellite receptions in single traffic router. Referring to FIG. 4, all received signals will be demodulated in step (300) in the modem and its key RF parameters measured in step (301) such as Eb/No, Bit Rate, and Receive Signal Level. Based on the measured key RF parameters, the processor 224a, for example, in the modem at the remote terminal determines the Default Link, Default Throughput, Variable Links, and Variable Throughputs in step (302), as well as the Variable Link Margin and the Threshold Margin. A comparison operation is then performed. Specifically, when the Variable Link Margin is larger than or equal to the threshold margin, then the Variable Link is selected in step (303). Otherwise, the Default Link is selected in step (304). The threshold margin is specified by the modem specification, set by the service operator or set by the user. The selected link provides a baseband signal in TCP/IP protocol in step (305) to be passed to the IP Router in accordance with TCP/IP protocol in step (306).

More particularly, all received signals from C-, Ku-, and Ka-Bands will be demodulated in step (300) and the key RF parameters measured in step (301) such that each Eb/No, Bit Rate, and Receive Signal Level from the three spectrum are identified and stored in the modem. The key RF parameter is compared by a programmable device, such as a microprocessor (224a) residing internally or externally to the remote terminal modem. The microprocessor at the remote terminal determines the Default Link, Default Throughput, Variable Links, and Variable Throughputs in step (302). When the Variable Link Margin is larger or equal to the threshold margin, the Variable Link is selected in step (303). In all cases, the Default Link is maintained as a fall back link. When the Variable Link Margin is less than the threshold for a specified duration time, the Default Link is selected in step (304). Since the Default Link is always available, the transfer of the spectrum results in no interruption from the user's point of view. Further, the transfer is seamless to the user because the data packets sent from both spectrums have the same packet ID for the same content. Accordingly, no real time synchronization network is required, as TCP/IP will sort out the content synchronization. The threshold margin is specified by the modem specification or set by service operator or set by user. The selected link provides a baseband signal in TCP/IP protocol in step (305) to be passed to the IP Router in accordance with TCP/IP protocol in step (306). This process is repeated until the physical connection of the communication link is terminated.

An example will now be provided for describing the selection between the Default Link and the Variable link as follows. In this example, the satellite (FIG. 1, 005, SAT 1) has multiple payloads, such as Ku-Band and Ka-Band payloads, serving a common geographical area. The remote terminal (FIG. 1, 007) has dual feed Ku- and Ka-Bands pointed to SAT (001) for receiving the primary signal, suppose it is the Ku-Band signal. Once the received Ku-Band Signal Level rises above the threshold such that the communication link is closed, this Ku-Band signal is demodulated by the modem (224). This process is shown as step (300) in FIG. 4.

The modem continues the process in step (301) by measuring the RF parameters: Receive Signal Level, Bit Rate, and the Eb/No. A minimum received signal level is required in order for the modem (224) to stay above the noise floor, which is typically around −100 dBm, and a certain level of energy per bit (Eb) to noise density (No) ratio is required depending on the modulator selected (such as BPSK, QPSK, 8PSK, 16APSK, and so on) such that the communication link can be reliably established. Parameters of minimum received signal level, Eb/No and so on are stored inside the modem in memory (224*b*) of the Remote Terminal.

The next process is to determine the maximum throughput of the Default Link in step (302). The maximum throughput is set based on certain parameters. For example: it can be set from the actual measured Eb/No and required link margin based on geographical locations of the Remote Terminal. When the actual Eb/No and the minimum required link margin meet a certain type of modulation requirement then the maximum throughput can be determined for the Default Link. The process is the repeated for the Variable Links. The process then proceeds to steps (303) through (306) where the IP protocols takes on the next task of routing the traffic either via the Default Link or the Variable Link in order to process the baseband signal.

What is claimed is:

1. A method for communication to a destination over multiple satellite links using different spectrums, respectively, comprising:
   using C-, Ku-, and Ka-Bands for data communication in a single antenna dish and single router,
   measuring link performance parameters during the data communication, wherein data communication is permitted to the destination via a selected one of the Bands by a processor in accordance with a comparison between the measured link performance parameters and predetermined criteria;
   measuring the link performance parameters in real time;
   storing the measured link performance parameters in the destination;
   real time updating of the stored link performance parameters;
   determining a link that serves as a guaranteed link for communication;
   determining another alternative link, the guaranteed link having a lower throughput than a throughput of the another alternative link;
   simultaneously establishing a plurality of physical connections over the satellite link(s) from a source to the destination; and
   switching between the guaranteed link and the another alternative link so as to uniquely establish a single IP link between the source to the destination at any given time.

2. The method according to claim 1, wherein the method is for two way communication between a source and the destination, and wherein the links include two different spectrum diversities.

3. The method according to claim 1, wherein the links include three different spectrum diversities.

4. The method according to claim 1, further comprising using a remote terminal intelligent modem that communicates with a network hub modem in pair, and storing the measured link performance parameters in the modem.

5. The method according to claim 1, wherein a link can be set depending on a modulation scheme and the link performance parameters can be set by one of default or by a user.

6. The method according to claim 1, wherein a link can be detached from the actual link availability according to the physical link parameters.

7. A method according to claim 1, wherein the link occurs at the IP layer.

8. The method according to claim 1, wherein the method uses an apparatus for receiving a communication path over the multiple spectrums, the apparatus comprises a single antenna dish, multiple antenna feeds, multiple LNBs, a single router and an intelligent modem at the remote terminal.

9. The method according to claim 1, wherein the method uses no real time synchronization network.

10. The method according to claim 1, wherein the method is performed at the Internet Protocol (IP) layer.

11. A destination apparatus for receiving data over multiple satellite links using different spectrums, respectively, comprising:
    using C-, Ku-, and Ka-Bands for data communication in a single antenna dish and a single router, an intelligent modem for measuring link performance parameters during data communication, wherein the intelligent modem permits data communication via a selected one of the Bands in accordance with a comparison between the measured link performance parameters and predetermined criteria, wherein the intelligent modem determines a link that serves as a guaranteed link for communication, and determines another alternative link, the guaranteed link having a lower throughput than a throughput of the another alternative link; and wherein the intelligent modem automatically switches between the guaranteed link and alternative link in accordance with the comparison between the measured link performance parameters and predetermined criteria;
    simultaneously establishing a plurality of physical connections over the satellite link(s) from a source to the destination apparatus; and
    switching between the guaranteed link and the another alternative link so as to uniquely establish a single IP link between the source to the destination apparatus at any given time.

12. The apparatus according to claim 11, wherein the plurality of different bands comprises at least two of C-, Ku-, and Ka-Bands.

13. The apparatus according to claim 11, wherein the link performance parameters includes RF parameters of the communication link.

14. The apparatus according to claim 11, wherein the link performance parameters includes at least one of Eb/No, bit rate, and received signal level.

15. The apparatus according to claim 11, wherein the intelligent modem includes a processor and memory, and wherein the processor determines the selected one of the Bands.

16. The apparatus according to claim 11, wherein the link performance parameters includes at least one of Eb/No, bit rate, and received signal level.

17. The apparatus according to claim 11, wherein the plurality of different bands comprises at least two of C-, Ku-, and Ka-Bands.

18. The apparatus according to claim 11, wherein the guaranteed link is the C-band, and the alternative link is one of the Ku- and Ka-Bands.

\* \* \* \* \*